United States Patent
Young (10) Patent No.: US 10,809,110 B2
(45) Date of Patent: Oct. 20, 2020

(54) FLOW METER PROVER

(71) Applicant: METER ENGINEERS, INC., Kechi, KS (US)

(72) Inventor: William Bradley Young, Benton, KS (US)

(73) Assignee: METER ENGINEERS, INC., Kechi, KS (US)

( * ) Notice: Subject to any disclaimer, the term of this patent is extended or adjusted under 35 U.S.C. 154(b) by 188 days.

(21) Appl. No.: 15/946,191

(22) Filed: Apr. 5, 2018

(65) Prior Publication Data

US 2019/0310123 A1    Oct. 10, 2019

(51) Int. Cl.
*G01F 15/02*    (2006.01)
*G01F 3/16*    (2006.01)

(52) U.S. Cl.
CPC .............. *G01F 15/024* (2013.01); *G01F 3/16* (2013.01)

(58) Field of Classification Search
CPC ............. G01F 25/0015; G01F 25/0007; G01F 15/024; G01F 25/0038; G01F 25/0084
See application file for complete search history.

(56) References Cited

U.S. PATENT DOCUMENTS

| | | | | |
|---|---|---|---|---|
| 3,098,382 A * | 7/1963 | Hoffman | ............... | F15B 19/002 73/168 |
| 3,397,570 A * | 8/1968 | Pfrehm | ............... | G01F 25/0015 73/1.17 |
| 3,421,360 A * | 1/1969 | Luse | ............... | G01F 25/0015 73/1.23 |
| 3,423,988 A * | 1/1969 | Grove | ............... | G01F 25/0015 73/1.17 |
| 3,504,523 A * | 4/1970 | Layhe | ............... | G01F 25/0015 73/1.18 |
| 3,580,045 A * | 5/1971 | Pfrehm | ............... | G01F 25/0015 73/1.19 |
| 3,668,923 A * | 6/1972 | Grove | ............... | G01F 25/0015 73/1.17 |
| 3,678,730 A * | 7/1972 | Barrett, Jr. | ............... | G01F 25/0015 73/1.17 |

(Continued)

OTHER PUBLICATIONS

"The Calibron Small Volume Prover", Honeywell Enraf, Aug. 2009. (Year: 2009).*

(Continued)

*Primary Examiner* — David A. Rogers
(74) *Attorney, Agent, or Firm* — Stinson LLP (57) ABSTRACT

A flow meter prover with a piston assembly that is movable from a start position to a finish position and an actuator assembly with a carriage that moves between a first position and a second position. Preferably, the carriage is operable to releasably couple to the piston assembly, and the carriage is operable to move the piston assembly from the finish position to the start position as the carriage moves from the second position to the first position. The actuator assembly preferably includes a linear actuator that moves the carriage, and the carriage preferably includes an electromagnet that releasably couples to the piston assembly. The piston assembly preferably slides on a flag rod having first and second flags mounted thereon and two guide rods. A photoelectric sensor senses the flags as the piston assembly slides on the flag rod and generates signals when it senses the flags.

26 Claims, 9 Drawing Sheets

(56) References Cited

U.S. PATENT DOCUMENTS

| | | | | |
|---|---|---|---|---|
| 3,832,883 | A * | 9/1974 | Tyau | G01F 25/0015 73/1.18 |
| 3,955,399 | A * | 5/1976 | Neal | G01F 25/0015 73/1.18 |
| 3,978,707 | A * | 9/1976 | Grove | G01F 25/0015 73/1.16 |
| 4,106,328 | A * | 8/1978 | Neeff | G01F 25/0015 280/404 |
| 4,134,288 | A * | 1/1979 | Kim | G01F 25/0015 73/1.17 |
| 4,152,922 | A * | 5/1979 | Francisco, Jr. | G01F 25/0007 73/1.21 |
| 4,175,421 | A * | 11/1979 | Elderfield | G01F 25/0015 73/1.18 |
| 4,372,147 | A * | 2/1983 | Waugh | G01F 25/0015 73/1.17 |
| 4,379,991 | A * | 4/1983 | Ho | G01F 25/0053 324/636 |
| RE31,432 | E * | 11/1983 | Francisco, Jr. | G01F 25/0015 73/1.21 |
| 4,549,426 | A * | 10/1985 | Erickson | G01F 25/0015 73/1.17 |
| 4,569,220 | A * | 2/1986 | Hopfe | G01F 25/0015 73/1.17 |
| 4,606,218 | A * | 8/1986 | Chisman, III | G01F 25/0015 73/1.17 |
| 4,628,724 | A * | 12/1986 | Maurer | G01F 25/0015 73/1.17 |
| 4,637,244 | A * | 1/1987 | Maurer | G01F 25/0015 73/1.22 |
| 4,718,267 | A * | 1/1988 | Capper | G01F 25/0015 73/1.17 |
| 4,766,759 | A | 8/1988 | Cohrs et al. | |
| 4,829,808 | A * | 5/1989 | West | G01F 25/0015 73/1.17 |
| 5,052,211 | A | 10/1991 | Cohrs et al. | |
| 5,072,416 | A | 12/1991 | Francisco, Jr. et al. | |
| 5,076,093 | A * | 12/1991 | Jones, Jr. | A61B 5/091 73/1.22 |
| 5,170,656 | A | 12/1992 | Draus | |
| 5,317,895 | A * | 6/1994 | Ogawa | G01F 25/0015 73/1.19 |
| 5,392,632 | A * | 2/1995 | Umeda | G01F 25/0015 73/1.73 |
| 6,629,447 | B1 * | 10/2003 | Collins | G01F 25/0007 73/1.16 |
| 7,650,775 | B2 | 1/2010 | Ignatian | |
| 8,161,791 | B2 | 4/2012 | Ignatian | |
| 8,196,446 | B2 | 6/2012 | Ignatian | |
| 8,205,479 | B2 | 6/2012 | Ignatian | |
| 8,511,138 | B2 * | 8/2013 | Larsen | G01F 25/0015 73/1.01 |
| 8,578,752 | B2 | 11/2013 | Ignatian | |
| 8,677,800 | B2 | 3/2014 | Ignatian | |
| 8,826,717 | B2 * | 9/2014 | Van Bekkum | G01F 25/0015 73/1.22 |
| 8,950,235 | B2 * | 2/2015 | Heath | G01F 25/0015 134/22.11 |
| 9,103,709 | B2 | 8/2015 | Brown | |
| 9,316,527 | B2 * | 4/2016 | Rudroff | G01F 25/0092 |
| 9,719,837 | B2 * | 8/2017 | Rudroff | G01F 25/0015 |
| 2007/0068241 | A1 * | 3/2007 | Bains | G01F 17/00 73/149 |
| 2012/0024037 | A1 * | 2/2012 | Massey | G01F 25/0015 73/1.19 |
| 2013/0104621 | A1 * | 5/2013 | Larsen | G01F 25/0015 73/1.19 |
| 2015/0308882 | A1 * | 10/2015 | Yoshimoto | G01F 25/0007 73/1.22 |

OTHER PUBLICATIONS

Tim Patten, "Proving Coriolis Meters with Small Volume Provers", 34th International North Sea Flow Measurement Workshop, Oct. 25-28, 2016. (Year: 2016).*

"FMD090 Unidirectional Captive Displacement Prover Data Sheet", Flow Management Devices, LLC, 2016. (Year: 2016).*

"Unidirectional Captive Displacement Prover", Flow Management Devices, LLC, 2016. (Year: 2016).*

Flow Management Devices, LLC; Unidirectional Captive Displacement Prover Operating Manual; 2008; 51 pages; Flow Management Devices, LLC, Phoenix, AZ.

* cited by examiner

FLOW METER PROVER

CROSS-REFERENCE TO RELATED APPLICATIONS

Not applicable.

STATEMENT REGARDING FEDERALLY SPONSORED RESEARCH OR DEVELOPMENT

Not applicable.

STATEMENT REGARDING JOINT RESEARCH AGREEMENT

Not applicable.

BACKGROUND OF THE INVENTION

1. Field of the Invention

The invention relates to measuring fluid flow and, more particularly, to a flow meter prover for determining a volume correction factor for a flow meter.

2. Description of Related Art

A flow meter measures the volume of fluid passing through a pipeline. For example, a flow meter may measure the flow of a chemical formulation used in an industrial process or hydrocarbon flow during exploration or transportation. Because a flow meter is not completely accurate across its full range of flow rate capabilities, a flow meter prover is used to calculate a correction factor for the flow meter.

One type of conventional flow meter prover includes a cylinder that receives fluid from a pipeline having a flow meter that measures the volume of fluid passing through the pipeline. The flow meter prover has a piston that is pushed through the cylinder by the fluid. As the piston moves through the cylinder it traverses two detection points that correspond with a known volume of the cylinder. The flow meter prover compares this known volume to a volume calculated based on signals received from the flow meter during the time that the piston is between the two detection points. This process is typically repeated several times to determine a volume correction factor for the flow meter.

After the flow meter prover has completed a cycle, the piston must be reset back to its starting position before the flow meter prover can complete another run. A variety of different reset mechanisms have been used to reset the piston. In one type of conventional flow meter prover, a chain or belt is fixed to an end of the piston and a motor operates to tension the chain or belt and pull the piston back to its starting position. In this type of system, a clutch is conventionally used to allow the piston to move in the direction of the fluid flowing through the cylinder after the piston is reset. Conventional reset mechanisms, such as this, create resistance that hinders movement of the piston during its run, which incrementally wears down components of the flow meter prover. Further, conventional reset mechanisms are fairly complex and may take up relatively large amounts of space.

Another type of conventional reset mechanism includes chains or belts positioned on both sides of the piston rod and guided by sprockets or pulleys. A cross plate extends across the piston rod from one chain or belt to the other. The cross plate travels in a generally elliptical path toward the cylinder underneath the piston rod and away from the cylinder above the piston rod. To reset the piston, a motor drives the sprockets or pulleys to move the cross plate underneath the piston rod toward the cylinder and then around to the top side of the piston rod where it engages a catch plate on the piston rod. The cross plate pushes the piston rod back to its starting position as it moves away from the cylinder. The cross plate then moves downward below the piston rod so that the cross plate releases from the catch plate on the piston rod. This allows the piston rod to move back downstream and complete another run.

Further, for at least one type of conventional flow meter prover, the detection points that define the known volume of the cylinder are a pair of stationary optical eyes that are mounted to a switch rod. The optical eyes sense a flag that is mounted to the piston rod as it moves. The known volume of the cylinder is certified by the means of waterdraw calibration based on the volume of water displaced by the piston from when the leading edge of the first optical eye is aligned with the flag to when the leading edge of the second optical eye is aligned with the flag. If the optical eyes need to be removed and replaced for maintenance reasons, the volume must be recertified to ensure the accuracy of the volume correction factor calculated by the flow meter prover.

Because the distance between the optical eyes changes as temperature change causes the switch rod to expand or contract, the temperature of the switch rod is typically monitored to calculate a rod correction factor. The rod correction factor is used to calculate an adjusted volume of the cylinder that is used in the calculation of the volume correction factor. The temperature of the switch rod is typically measured with an electronic temperature sensor that is fixed to a thermo-well, which in turn is attached or welded to the switch rod at a location between the optical eyes. With this design, the temperature measured by the temperature sensor may be an inaccurate representation of the true temperature of the switch rod because (i) the temperature sensor only measures the temperature at one location of the rod and (ii) a majority of the thermo-well is typically exposed to the temperature of the ambient air.

BRIEF SUMMARY OF THE INVENTION

A flow meter prover in accordance with one embodiment of the invention described herein has a piston assembly that is movable from a start position to a finish position and an actuator assembly with a carriage that moves between a first position and a second position. Preferably, the carriage is operable to releasably couple to the piston assembly, and the carriage is operable to move the piston assembly from the finish position to the start position as the carriage moves from the second position to the first position. Preferably, the actuator assembly includes a linear actuator with a rail that the carriage slidably engages, wherein the linear actuator moves the carriage linearly on the rail between the first and second positions. The carriage preferably includes an electromagnet that is operable to releasably couple to the piston assembly. The actuator assembly preferably decouples from the piston assembly when the piston assembly moves from its start position to its finish position so that the actuator assembly does not resist movement of the piston assembly from its start position to its finish position.

The flow meter prover preferably includes a flag rod that is slidably received by an opening of the piston assembly, a first flag mounted to the flag rod, a second flag mounted to the flag rod and spaced apart from the first flag, and a photoelectric sensor mounted to the piston assembly adjacent the opening. The photoelectric sensor is operable to sense the first flag and the second flag as the piston assembly slides on the flag rod. The photoelectric sensor generates a first signal when it senses the first flag and a second signal when it senses the second flag. The flow meter prover preferably includes a cylinder with a fluid inlet and a fluid outlet. Fluid entering the fluid inlet is operable to move the piston assembly from its start position to its finish position. A processor coupled to the photoelectric sensor preferably receives the first signal and the second signal and calculates a volume correction factor based on a known, certified volume of the cylinder when the photoelectric sensor is between the first and second flags, and a volume calculated by a flow meter during the time between receiving the first signal and receiving the second signal. The first and second flags, which determine the volume points of the flow meter prover, are mounted in fixed positions on the flag rod and do not need to be removed from the flag rod in the event of necessary maintenance or replacement of the photoelectric sensor. Thus, when the photoelectric sensor is replaced or repaired, the known, certified volume of the cylinder does not need to be recertified because the flags are not disturbed.

Preferably, the flag rod presents a hollow interior that is filled with a fluid. A temperature sensor is preferably at least partially positioned within the hollow interior of the flag rod. The temperature sensor generates a temperature signal corresponding with the temperature of the flag rod. The processor is coupled to the temperature sensor for receiving the temperature signal. The processor preferably uses the temperature signal to calculate a change in distance between the first and second flags based on thermal expansion or contraction of the flag rod. The change in distance between the flags on the flag rod is used to calculate the known volume of the cylinder that is used to calculate the volume correction factor. It is believed that a more accurate determination of the flag rod temperature is obtained by measuring the temperature of the fluid that fills the entire flag rod. Also, no part of the temperature sensor is exposed to the ambient conditions.

Preferably, the piston assembly includes a guide plate with three bearings each mounted within a different opening in the guide plate. The flag rod and two guide rods are each slidably received by one of the bearings. The bearings, flag rod and guide rods preferably prevent binding and ensure that the piston assembly remains centered as it moves between its start and finish positions.

The piston assembly also preferably includes a resilient target that is releasably engaged by the actuator assembly. The resilient target preferably absorbs force and energy from the actuator assembly as the actuator assembly engages and couples to the piston assembly. This prevents damage to components of the flow meter prover such as seals and bearings.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
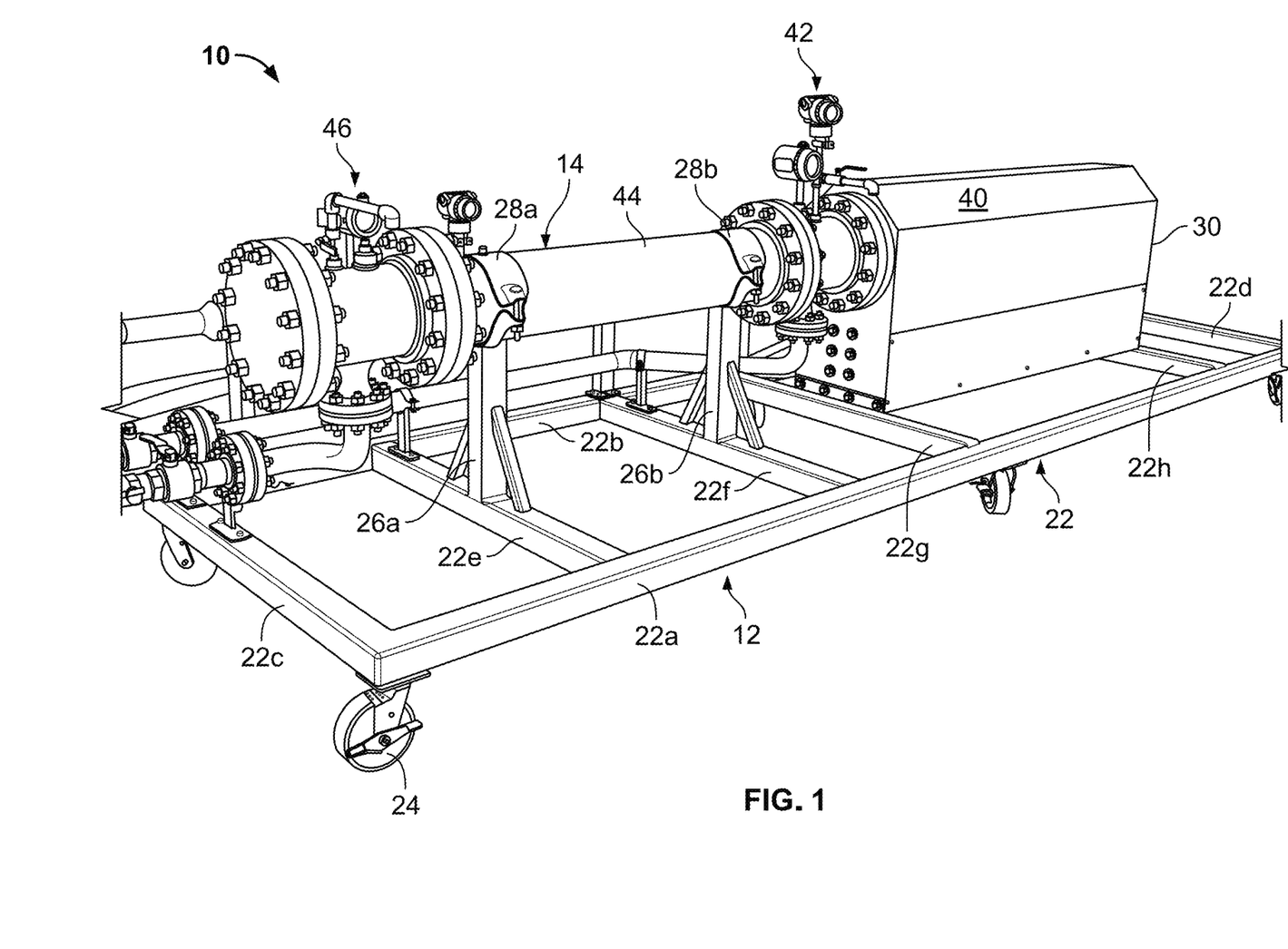
FIG. 1 is a perspective view of a flow meter prover in accordance with one embodiment of the invention described herein.

A flow meter prover in accordance with a preferred embodiment of the invention described herein is identified generally as 10 in FIG. 1. Flow meter prover 10 includes a frame 12, a fluid flow assembly 14, a piston assembly 16 (FIG. 2), an actuator assembly 18 (FIG. 2), a sensing system 20 (FIG. 2), and a control system 21 (FIG. 2).

Frame 12 includes a base 22 that is generally rectangular and formed from welded tubes or bars having a square or rectangular cross-section, or channel iron (e.g., C-channel iron). Base 22 includes side tubes 22a-b and end tubes 22c-d that are joined to form an outer rectangular perimeter, and base 22 includes cross tubes 22e-h that are joined to and extend between side tubes 22a-b. Side tubes 22a-b, end tubes 22c-d, and cross tubes 22e-h may also be formed from channel iron (e.g., C-channel iron). Caster wheels, one of which is identified as 24, are mounted to corners of base 22 and in the center of side tubes 22a-b. Frame 12 includes vertical posts 26a-b that are mounted to cross tubes 22e-f, respectively. Circular clamps 28a-b are mounted to the tops of vertical posts 26a-b. Circular clamps 28a-b receive and mount fluid flow assembly 14 to frame 12. Frame 12 includes an actuator housing 30 that is mounted to cross tubes 22g-h. Actuator housing 30 includes end plates 32 and 34 (FIG. 2) and side panels 36 and 38 (FIG. 3A) mounted to end plates 32 and 34. A flag rod 39a and guide rods 39b and 39c are each mounted to both of end plates 32 and 34 and extend between the end plates 32, 34. Guide rods 39b and 39c are positioned substantially within the same horizontal plane. Guide rods 39b and 39c are spaced apart a distance sufficient so that a portion of actuator assembly 18 may move between the guide rods 39b and 39c. Flag rod 39a is positioned above guide rods 39b and 39c in a vertical plane that is approximately equidistant from guide rods 39b and 39c. A cover 40 is mounted to a top edge of side panel 38 with a hinge. Cover 40 is moveable between the closed position shown in FIG. 1 and the open position shown in FIG. 3A.

Figure 2:
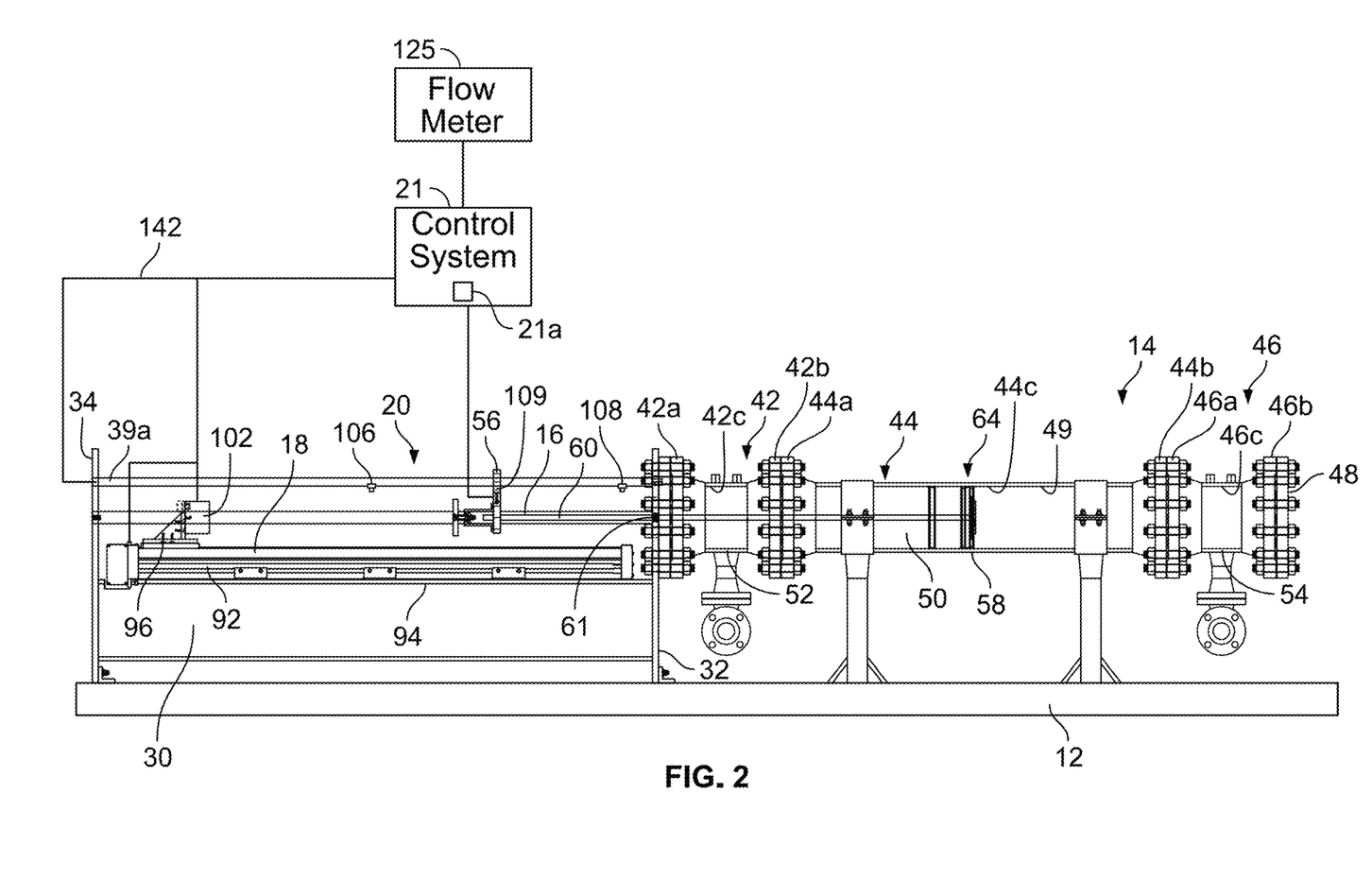
FIG. 2 is a side schematic view of the flow meter prover of FIG. 1.

Referring to FIG. 2, fluid flow assembly 14 includes an inlet assembly 42, a center assembly 44, and an outlet assembly 46. Inlet assembly 42 includes a pair of flanges 42a-b, center assembly 44 includes a pair of flanges 44a-b, and outlet assembly 46 includes a pair of flanges 46a-b. Flange 42a of inlet assembly 42 is mounted to end plate 32 with a plurality of fasteners. Flanges 42b and 44a are joined with a plurality of fasteners, and flanges 44b and 46a are joined with a plurality of fasteners. An end plate 48 is joined to flange 46b. The end plate 32, inlet assembly 42, center assembly 44, and outlet assembly 46 may be decoupled from each other to facilitate maintenance of flow meter prover 10 and access to portions of piston assembly 16 within fluid flow assembly 14.

When assembled, inner side walls 42c, 44c, and 46c of inlet assembly 42, center assembly 44, and outlet assembly 46, respectively, form a cylinder 49 that defines a generally cylindrical interior chamber 50. A fluid inlet 52 formed in inlet assembly 42 is in fluid communication with interior chamber 50, and a fluid outlet 54 formed in outlet assembly 46 is in fluid communication with interior chamber 50.

Piston assembly 16 has a first end 56 positioned within actuator housing 30 and a second end 58 positioned within cylinder 49. Piston assembly 16 includes a piston rod 60 that extends from first end 56 to second end 58 through a sealed opening 61 in end plate 32. Piston rod 60 is slidably received by sealed opening 61. A guide plate 62 (FIG. 5) is mounted to piston rod 60 at first end 56, and a piston and poppet valve assembly 64 (FIG. 2) is mounted to piston rod 60 at second end 58. Piston and poppet valve assembly 64 preferably has a structure and functions similar to a conventional piston and poppet valve assembly for a meter prover. The function of piston and poppet valve assembly 64 is described in more detail below.

Figure 5:
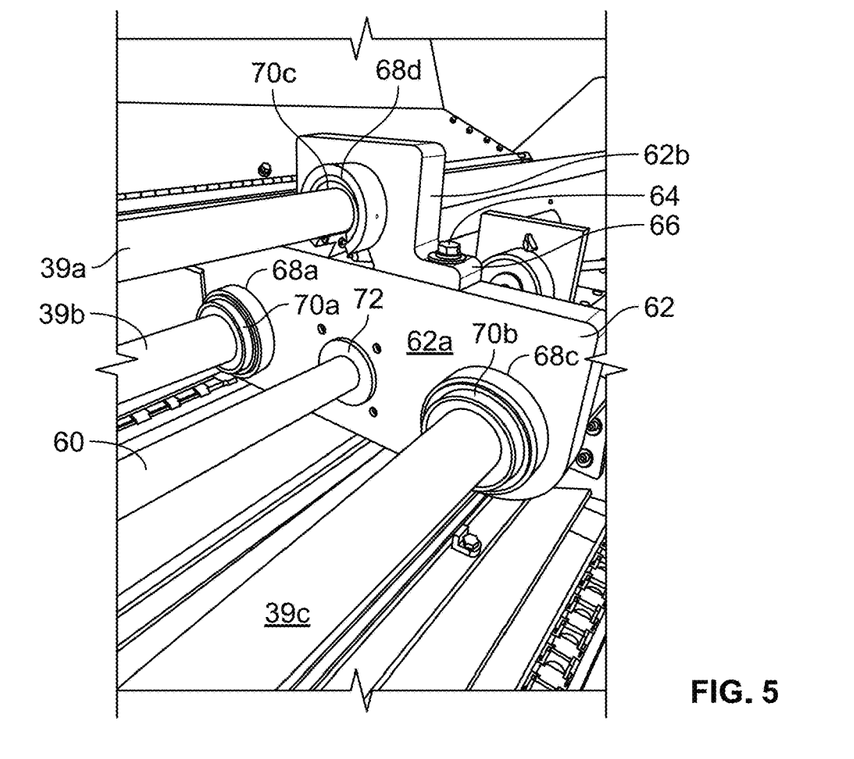
FIG. 5 is a perspective view of one side of a guide plate of the piston assembly.
Figure 7:
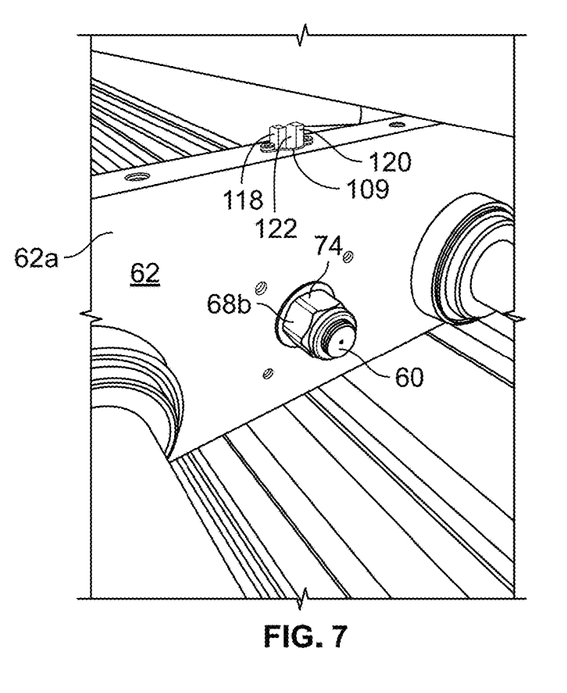
FIG. 7 is a perspective view of the side of the guide plate shown in FIG. 6 with portions removed to show certain features.

Referring to FIG. 5, guide plate 62 includes a first section 62a that is generally rectangular and a second section 62b that is mounted to first section 62a with fasteners, one of which is identified as 65. Second section 62b is also generally rectangular but includes flanges, one of which is identified as 66, on either side that receive the fasteners 65 mounting it to first section 62a. First section 62a and guide plate 62 includes three openings 68a, 68b (FIG. 7), and 68c that are generally aligned in a horizontal plane across the guide plate 62. Bearings 70a and 70b are mounted to guide plate 62 within openings 68a and 68c, and opening 68b receives a portion of piston rod 60 (FIG. 7). Second section 62b includes an opening 68d, within which a bearing 70c is mounted. Bearings 70a, 70b, and 70c slidably receive guide rods 39b-c and flag rod 39a respectively, allowing guide plate 62 to slide on and with respect to the flag rod 39a and guide rods 39b-c. Bearings 70a-c preferably prevent binding as guide plate 62 slides on flag rod 39a and guide rods 39b-c. The use of one flag rod 39a, two guide rods 39b-c, and three bearings 70a-c also keeps piston rod 60 centered with respect to the opening 61 in end plate 32 and the axial center of cylinder 49.

Referring to FIG. 5, piston rod 60 includes an annular flange 72 that is joined to the cylindrical outer surface of the piston rod 60 preferably by welding. Annular flange 72 is positioned near the first end 56 of piston assembly 16 and abuts the portion of guide plate 62 surrounding opening 68b (FIG. 7). Annular flange 72 has a diameter that is greater than the diameter of opening 68b. As shown in FIG. 7, a portion of piston rod 60 extends through opening 68b in guide plate 62 and has external threads. A nut 74 engages the threads of piston rod 60 to mount piston rod 60 to guide plate 62. As nut 74 is tightened into abutment with guide plate 62, annular flange 72 is drawn into contact with guide plate 62, which clamps guide plate 62 between annular flange 72 and nut 74 and securely mounts piston rod 60 to guide plate 62.

Figure 6:
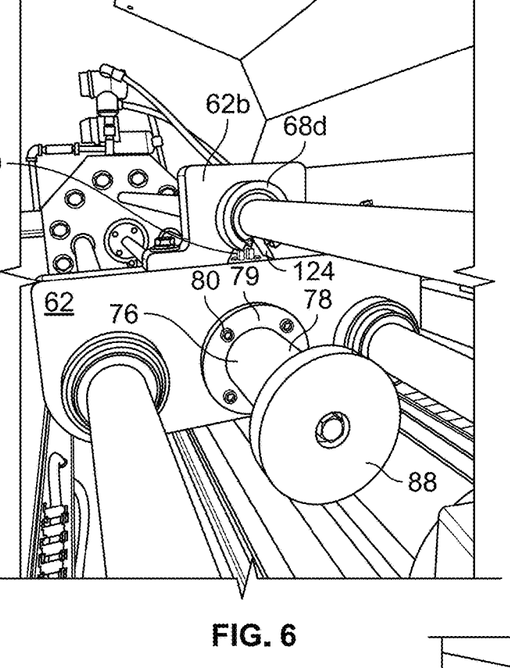
FIG. 6 is a perspective view of the opposite side of the guide plate.
Figure 9:
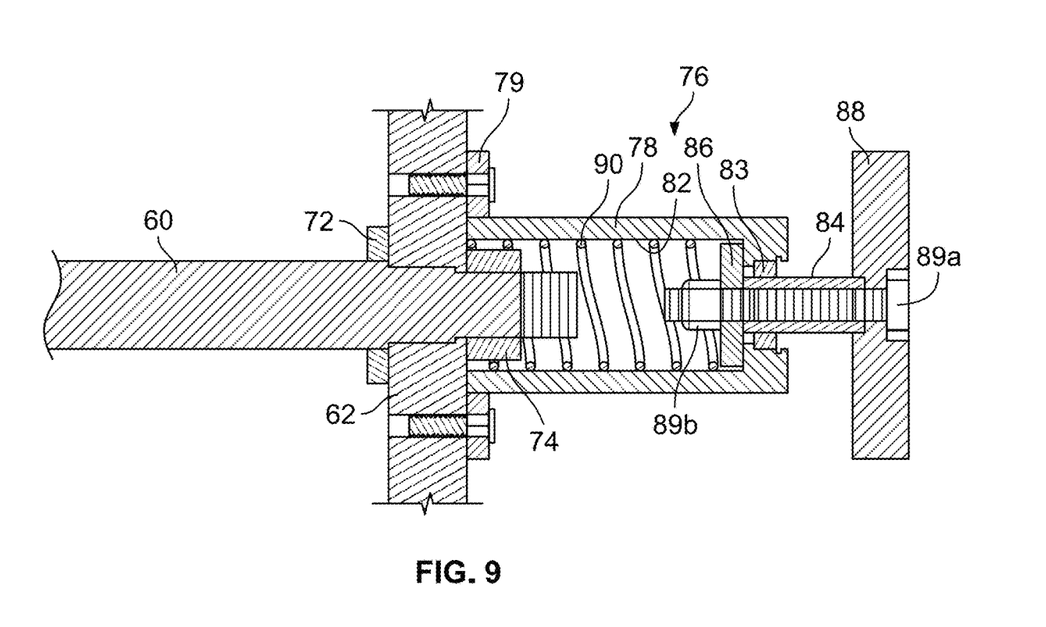
FIG. 9 is a cross-sectional view of a resilient target of the piston assembly.

Referring to FIGS. 6 and 9, a resilient target 76 is mounted to the side of guide plate 62 facing end plate 34 (FIG. 2) of actuator housing 30. Resilient target 76 is positioned at the first end 56 of piston assembly 16. Resilient target 76 includes a cylindrical housing 78 with a flange 79 on one end that is mounted to guide plate 62 with fasteners, one of which is identified as 80 in FIG. 6. An opening 82 (FIG. 9) extends through cylindrical housing 78. A bushing 83 mounted within opening 82 slidably receives a rod 84. A retainer 86 is coupled to the end of rod 84 positioned within cylindrical housing 78. At the end of cylindrical housing 78 opposite guide plate 62, the opening 82 has a diameter that is less than the external diameter of retainer 86 to prevent rod 84 from sliding out of cylindrical housing 78. A target disc 88 is coupled to the end of rod 84 positioned outside of cylindrical housing 78. A bolt 89a extends through aligned openings in target disc 88, rod 84, and retainer 86. A nut 89b is threaded on bolt 89a within housing 78. Nut 89b abuts retainer 86 to clamp rod 84 between retainer 86 and target disc 88. A compression spring 90 is positioned within cylindrical housing 78 between retainer 86 and guide plate 62. Cylindrical housing 78, rod 84, and spring 90 are sized so that spring 90 biases target disc 88 away from the end of cylindrical housing 78, such that there is a gap between target disc 88 and the end of cylindrical housing 78. As force is applied to target disc 88 in a direction extending toward guide plate 62, spring 90 resists the force slowing movement of rod 84 with respect to cylindrical housing 78.

Figure 3A:
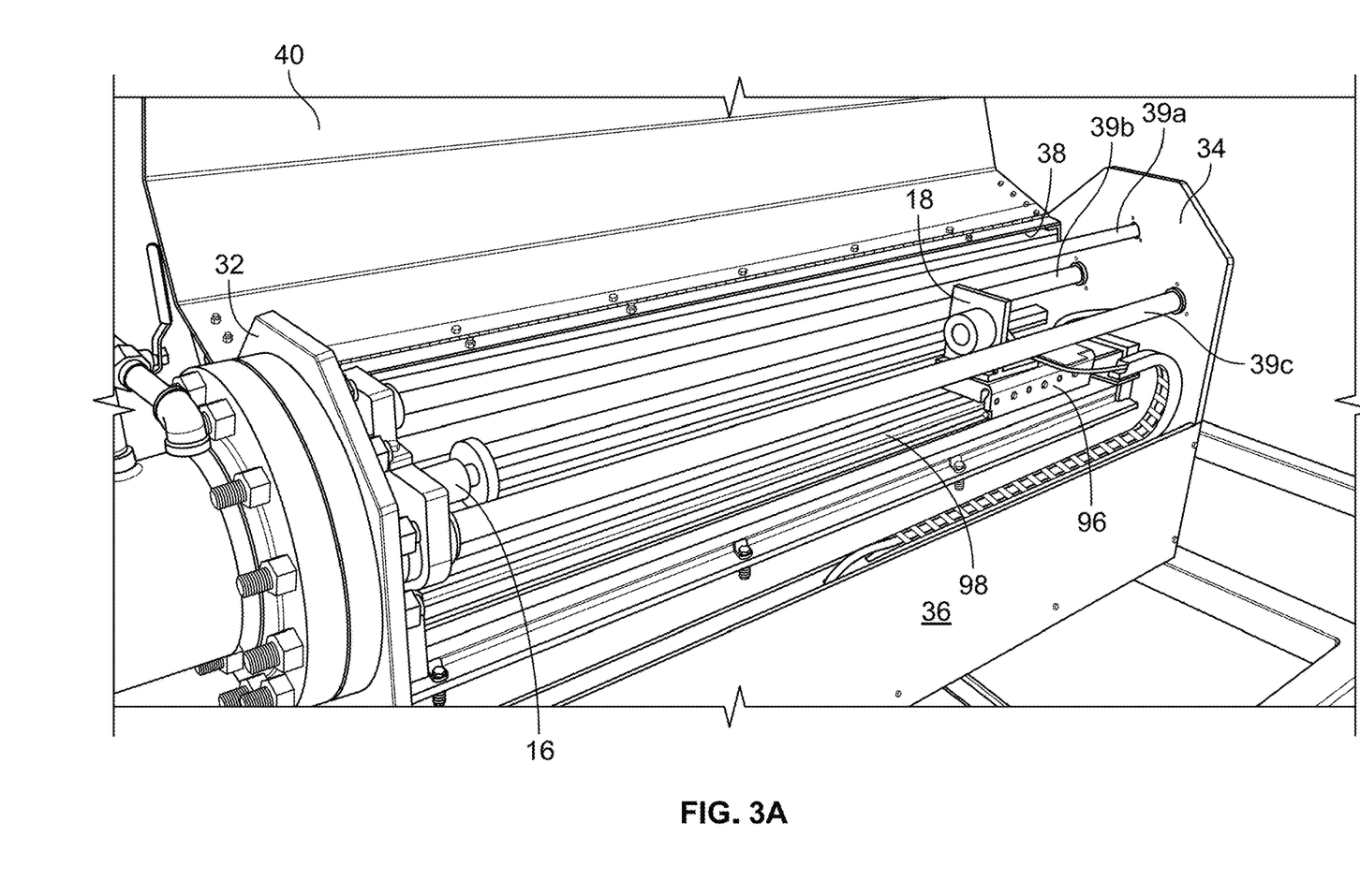
FIG. 3A is a perspective view showing an actuator assembly of the flow meter prover of FIG. 1 in a first position and a piston assembly in a finish position.
Figure 3B:
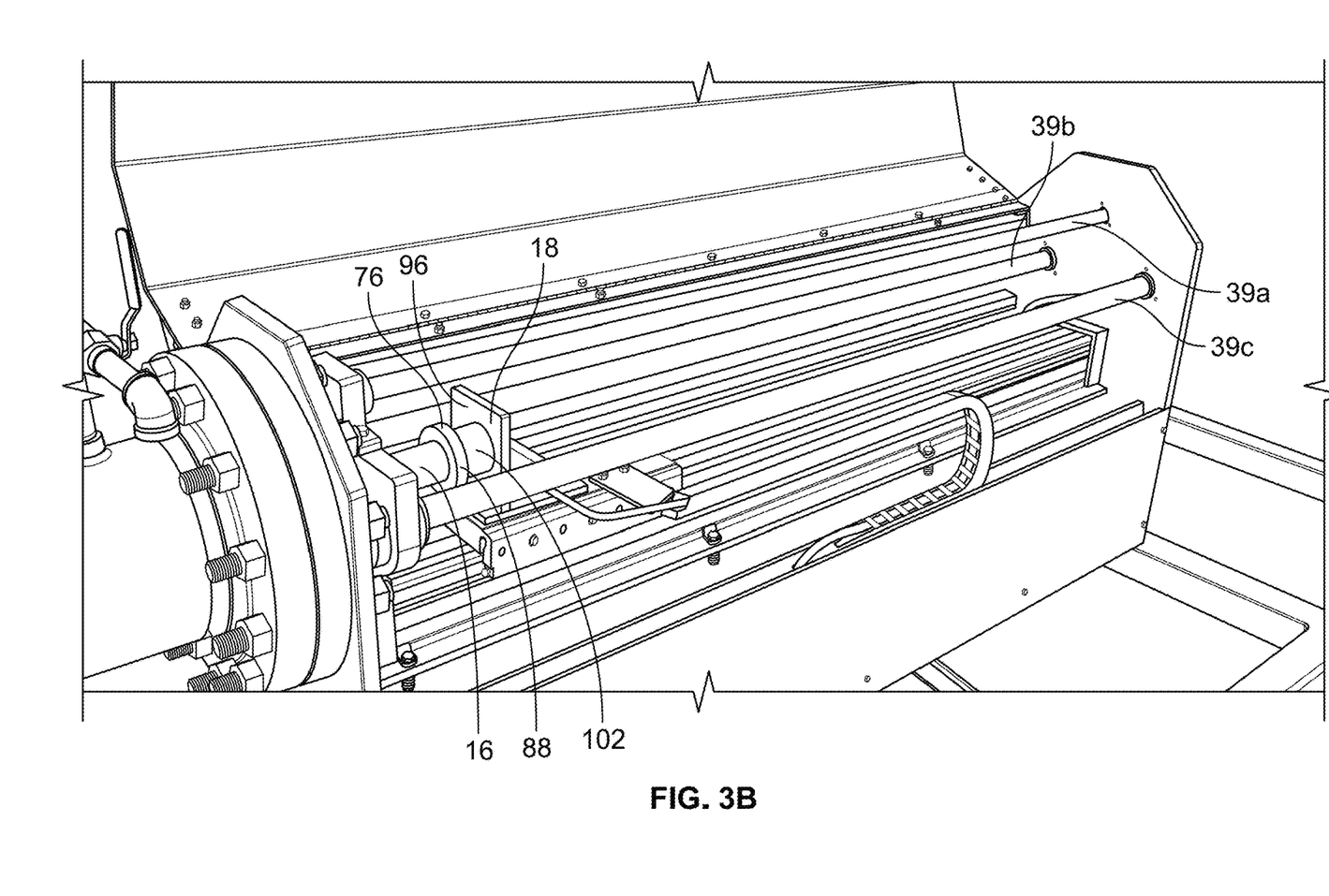
FIG. 3B is a perspective view showing the actuator assembly in a second position.
Figure 3C:
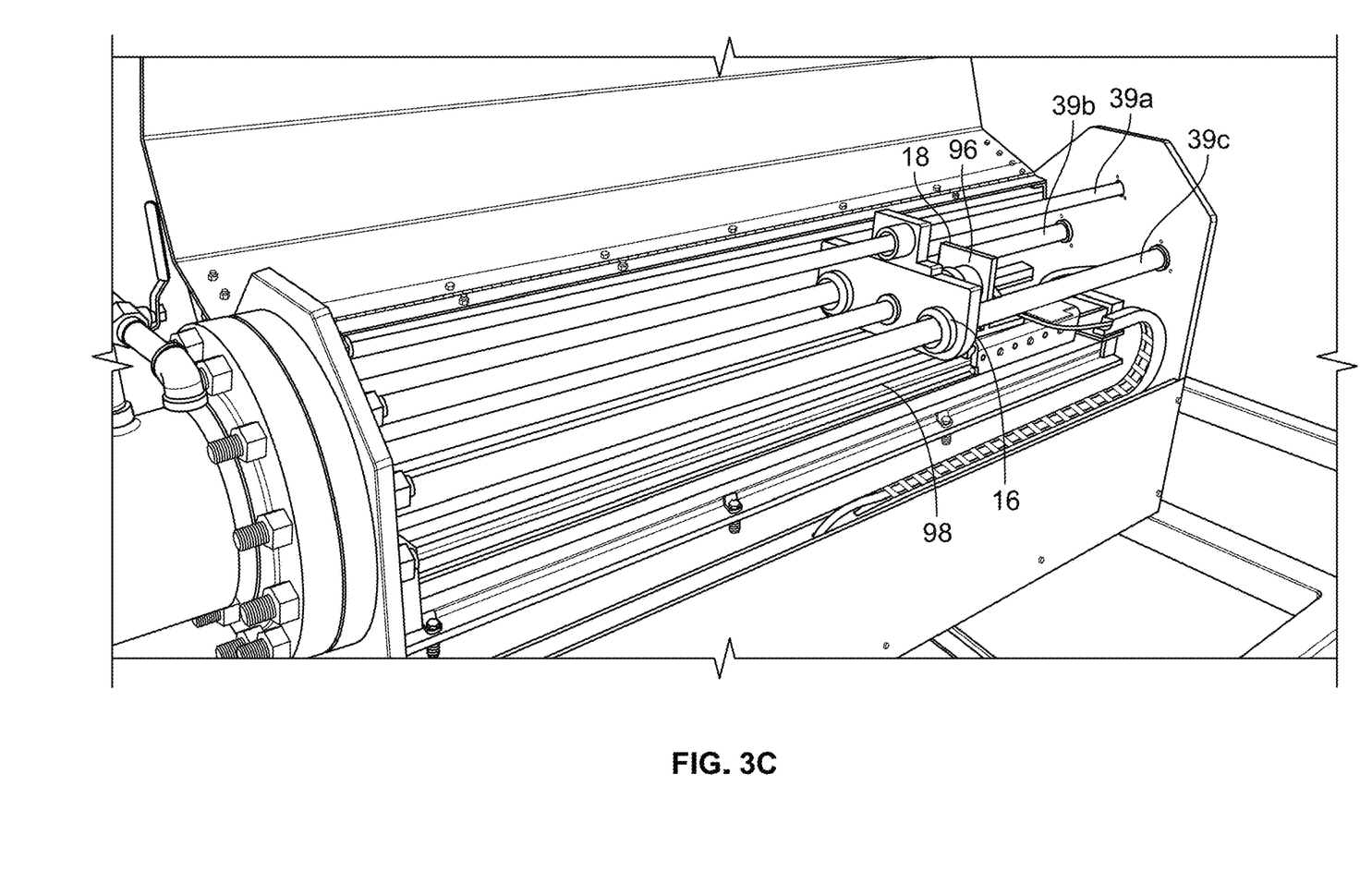
FIG. 3C is a perspective view showing the piston assembly in a start position.

Piston assembly 16 slides on flag rod 39a and guide rods 39b-c with respect to frame 12 and fluid flow assembly 14 between the start position shown in FIG. 3C and the finish position shown in FIG. 3A. Piston assembly 16 moves from the start position (FIG. 3C) to the finish position (FIG. 3A) when actuator assembly 18 is uncoupled from piston assembly 16 and fluid entering fluid inlet 52 (FIG. 2) engages piston and poppet valve assembly 64 to move piston assembly 16. Piston assembly 16 moves from the finish position (FIG. 3A) back to the start position (FIG. 3C) via actuator assembly 18, as described in more detail below.

Figure 4:
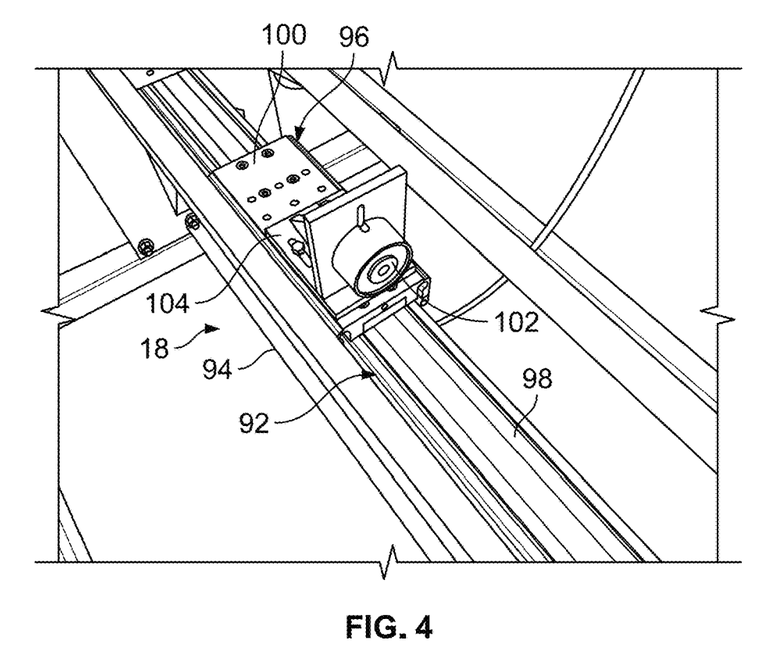
FIG. 4 is a perspective view of a carriage and an electromagnet of the actuator assembly.

Referring to FIGS. 2 and 4, actuator assembly 18 includes a linear actuator 92 that is mounted to a frame rail 94, which extends between end plates 32 and 34, of frame 12 and a carriage 96. Linear actuator 92 has a rail 98 (FIG. 4) that carriage 96 slidably engages. Linear actuator 92 is preferably a ball screw linear actuator such as a Tolomatic B3S 20 Series linear actuator, which includes a motor (not shown) that rotates a screw (not shown), which engages a portion of carriage 96 to slide it in either direction on the rail 98. Actuator assembly 18 may however include any type of actuation mechanism capable of moving piston assembly 16 from its finish position (FIG. 3A) back to its start position (FIG. 3C). For example, linear actuator 92 may be a belt driven actuator.

As shown in FIG. 4, carriage 96 includes a base plate 100 that engages rail 98 and an electromagnet 102 that is mounted to base plate 100 with an L-shaped bracket 104. Electromagnet 102 is aligned with target disc 88 of resilient target 76. Linear actuator 92 is operable to linearly move carriage 96 on rail 98 from a first position shown in FIG. 3A to a second position shown in FIG. 3B and back from the second position to the first position. Carriage 96 is operable to releasably couple to the first end 56 of piston assembly 16 via electromagnet 102, which is operable to releasably engage target disc 88 of resilient target 76, as shown in FIG. 3B. Resilient target 76 is preferably formed from a magnetic material that can engage electromagnet 102, such as low carbon steel. When electromagnet 102 is powered on and positioned near target disc 88, electromagnet 102 engages and couples to target disc 88, and when electromagnet 102 is powered off, electromagnet 102 becomes decoupled from and disengages target disc 88.

Carriage 96 is operable to move piston assembly 16 from its finish position (FIG. 3A) to its start position (FIG. 3C) as follows. First, linear actuator 92 is powered on to move carriage 96 from its first position shown in FIG. 3A to its second position shown in FIG. 3B. Electromagnet 102 is powered on so that it may engage and couple to target disc 88. Linear actuator 92 preferably moves carriage 96 at a faster speed from its first position to near its second position and then slows the speed of carriage 96 when electromagnet 102 is near target disc 88. For example, carriage 96 may initially move at a speed of fourteen in/sec and then drop to a speed of two in/sec as it nears target disc 88. As electromagnet 102 nears target disc 88, as shown in FIG. 3B, the magnetic force between the electromagnet 102 and target disc 88 couples the two components together. When electromagnet 102 and target disc 88 become coupled together, carriage 96 may still be moving toward resilient target 76. If this is the case, target disc 88 moves closer to cylindrical housing 78 (FIG. 9) as rod 84 slides within the opening 82 of cylindrical housing 78 toward guide plate 62. Movement of rod 84 towards guide plate 62 causes spring 90 to compress and absorb the force and energy transferred to resilient target 76 by carriage 96. The transfer of force and energy from carriage 96 to spring 90 reduces impact loads on and prevents damage to other components of meter prover 10, such as electromagnet 102 and seals of piston assembly 16. Carriage 96 preferably stops moving in a direction toward guide plate 62 before target disc 88 hits the end of cylindrical housing 78.

With electromagnet 102 coupled to target disc 88, linear actuator 92 then reverses direction to move carriage 96 from the second position shown in FIG. 3B to the first position shown in FIG. 3C. As carriage 96 moves from the second position to the first position, it moves piston assembly 16 from its finish position to its start position. When electromagnet 102 is powered off, piston assembly 16 becomes decoupled from actuator assembly 18 and fluid entering fluid inlet 52 (FIG. 2) moves piston assembly 16 from its start position to its finish position. Because actuator assembly 18 is decoupled from piston assembly 16, actuator assembly 18 does not resist movement of piston assembly 16 as it moves from the start position to the finish position. Electromagnet 102 is preferably a 12V Magnetool model #8955-18 electromagnet; however, carriage 96 may include any suitable electromagnet or other structure adapted to releasably engage piston assembly 16 to move it from its finish position to its start position and then disengage piston assembly 16 so that it may move back to its finish position.

Figure 8:
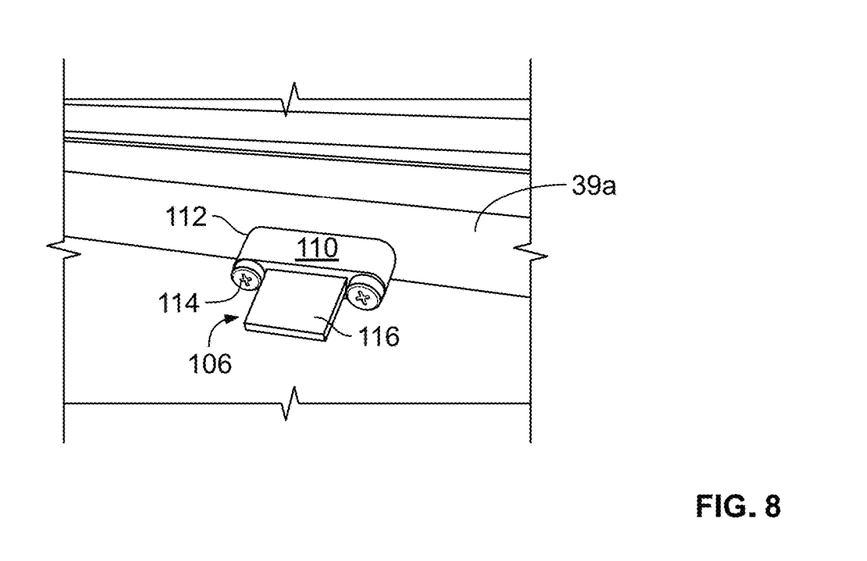
FIG. 8 is a perspective view of a stationary flag of the flow meter prover of FIG. 1.

Sensing system 20 includes first and second spaced apart stationary flags 106 and 108 (FIG. 2) that are each mounted to flag rod 39a and a photoelectric sensor 109 (FIG. 6) that is mounted to guide plate 62 adjacent opening 68d. Stationary flags 106 and 108 are substantially similar. Accordingly, only stationary flag 106 is described in detail herein. Referring to FIG. 8, stationary flag 106 includes a base 110 that is received by a slot 112 in flag rod 39a. Base 110 has a generally rectangular cross section with rounded ends. Two screws, one of which is identified as 114 in FIG. 8, secure base 110 to flag rod 39a. A planar sheet 116 is integral with base 110 and extends downward from base 110 away from flag rod 39a.

As shown in FIG. 7, photoelectric sensor 109 is mounted to a top surface of the first section 62a of guide plate 62. Photoelectric sensor 109 includes a light emitter 118 and a light detector 120. A slot 122 is positioned between the light emitter 118 and the light detector 120. Slot 122 is positioned with respect to guide plate 62 so that as guide plate 62 slides on flag rod 39a past one of stationary flags 106 or 108, the stationary flag 106 or 108 extends downward into slot 122 and blocks the transmission of light from light emitter 118 to light detector 120 (i.e., slot 122 is aligned with stationary flags 106 and 108). Stationary flags 106 and 108 are preferably sized so that they can slide freely through slot 122 as guide plate 62 slides on flag rod 39a. A triangular cut-out 124 (FIG. 6) in the bottom of the second section 62b of guide plate 62 provides clearance for the stationary flags 106 and 108 as they slide through cut-out 124. When first stationary flag 106 or second stationary flag 108 interrupt the transmission of light between the light emitter 118 and the light detector 120, photoelectric sensor 109 is operable to sense the respective first or second stationary flag 106, 108 as piston assembly 16 slides on flag rod 39a and guide rods 39b-c. Photoelectric sensor 109 generates a first signal when it senses first stationary flag 106 and a second signal when it senses second stationary flag 108. Photoelectric sensor 109 is preferably an OPTEK model #665T slotted optical switch; however, it is within the scope of the invention for the photoelectric sensor 109 to be any type of sensor suitable for sensing when guide plate 62 moves past one of stationary flags 106, 108.

Figures 10A, 10B, 10C:
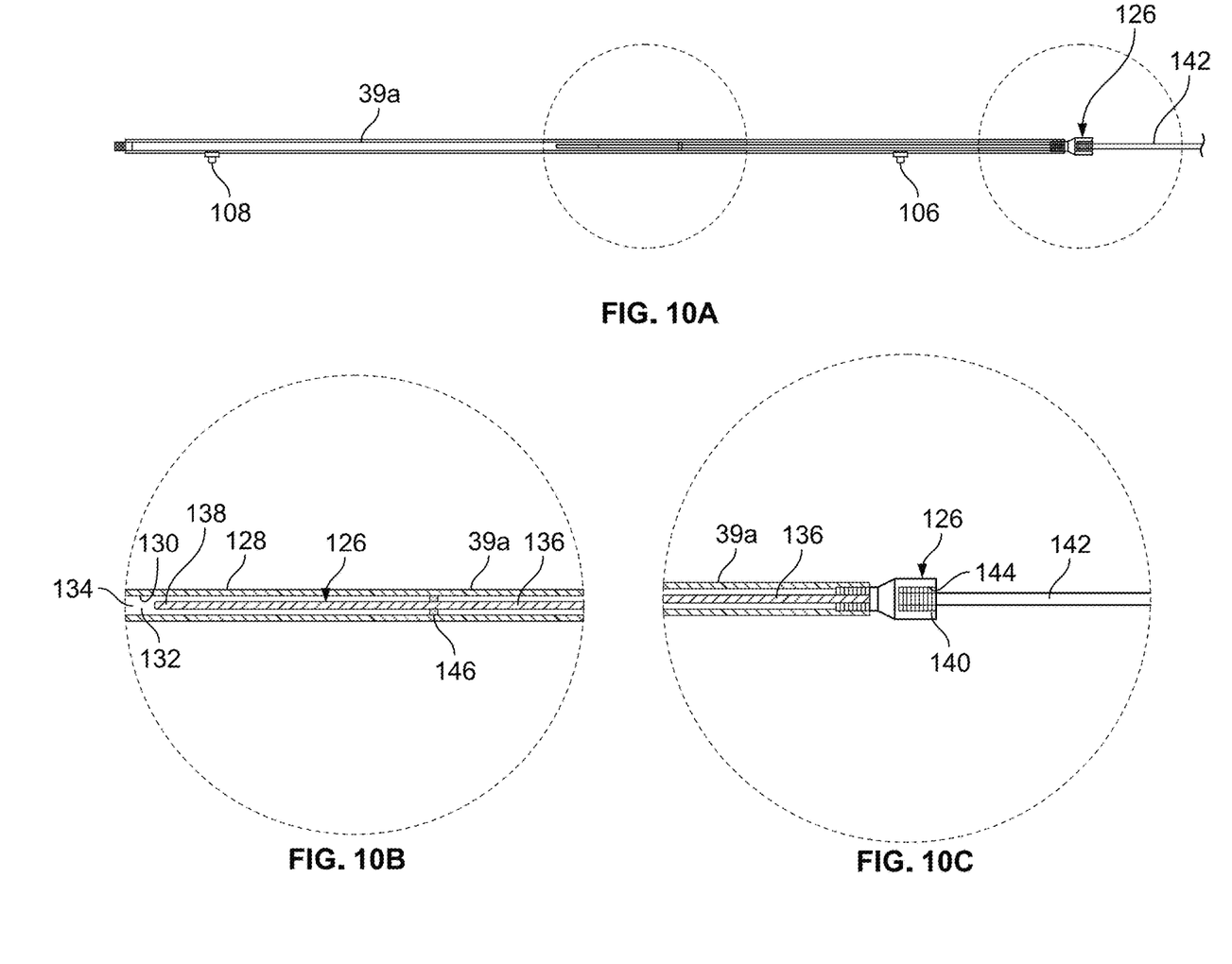
FIGS. 10A-10C show a temperature sensor assembly coupled to a flag rod of the flow meter prover of FIG. 1.

A temperature sensor assembly 126, shown in FIGS. 10A-10C, is coupled to flag rod 39a for sensing the temperature of flag rod 39a. Flag rod 39a includes a side wall 128 (FIG. 10B) with an interior surface 130 that surrounds a hollow interior 132. The hollow interior 132 is filled with a thermal buffer fluid 134. The thermal buffer fluid 134 is preferably glycol; however, it is within the scope of the invention for other suitable fluids to be used. The thermal buffer fluid 134 is in thermal communication with flag rod 39a such that the thermal buffer fluid 134 is preferably at approximately the same temperature as flag rod 39a.

Temperature sensor assembly 126 includes a temperature probe 136 that includes a temperature sensor 138 positioned near the end of the temperature probe 136. The temperature sensor 138 is positioned within the hollow interior 132 of the flag rod 39a for measuring the temperature of the thermal buffer fluid 134 within the flag rod 39a and hence the temperature of the flag rod 39a. Temperature sensor assembly 126 includes a conduit hub 140 (FIG. 10C) that is coupled to temperature probe 136. Conduit hub 140 threadably engages the interior surface 130 of flag rod 39a at an end of flag rod 39a adjacent end plate 34 (FIG. 2). Conduit hub 140 preferably sealingly engages flag rod 39a to contain the thermal buffer fluid 134 within flag rod 39a. Wires 142 extend through conduit hub 140 and are coupled to temperature sensor 138. Conduit hub 140 includes internal threads 144 that are configured for threadably engaging threads on a conduit (not shown) that may enclose wires 142. The wires 142 are electrically coupled with control system 21, as shown in FIG. 2. It is also within the scope of the invention for temperature sensor 138 to be wirelessly coupled with control system 21, and for other types of temperature sensor assemblies to be used other than the temperature probe shown in FIGS. 10A-C.

Flag rod 39a includes a sensor guide 146 that is coupled to the interior surface 130. The sensor guide 146 is generally disc shaped and includes a central, sensor opening 148 that receives a portion of temperature probe 136. Sensor guide 146 preferably ensures that the temperature probe 136 and temperature sensor 138 are positioned in the center of the hollow interior 132 of flag rod 39a and not in contact with the interior surface 130 of flag rod 39a. In this manner, temperature sensor 138 measures the temperature of the thermal buffer fluid 134, which is preferably at approximately the same temperature as flag rod 39a. Temperature sensor 138 generates a temperature signal that represents the temperature and/or change in temperature of flag rod 39a. The temperature signal is transmitted to control system 21 via wires 142.

Control system 21 is electrically coupled to linear actuator 92, electromagnet 102, photoelectric sensor 109, temperature sensor 138, and a flow meter 125, as shown in FIG. 2. Control system 21 preferably includes a processor 21a that is electrically coupled to linear actuator 92, electromagnet 102, photoelectric sensor 109, temperature sensor 138, and flow meter 125. Control system 21 also preferably includes a display screen (e.g., a monitor), a user input device, (e.g., a keyboard or mouse), memory that is electrically coupled with processor 21a and that stores instructions for processing by processor 21a, and a storage device for storing data generated by processor 21a. Processor 21a is operable to send instructions to linear actuator 92 to control the movement of carriage 96 from its first position to its second position and back to its first position. Processor 21a is operable to send instructions to electromagnet 102 to power the electromagnet 102 on and off at desired times. Processor 21a receives the first signal and the second signal from photoelectric sensor 109 when photoelectric sensor 109 senses the first stationary flag 106 and the second stationary flag 108, respectively. Photoelectric sensor 109 sends the first and second signals to control system 21 for processing. Processor 21a receives the temperature signal from temperature sensor 138. Processor 21a is operable to receive signals from the flow meter 125 and calculate a volume of fluid flowing through the flow meter 125 during the time between when the processor 21a receives the first signal and the second signal from photoelectric sensor 109.

Processor 21a calculates a volume correction factor for flow meter 125 based in part on the first signal and the second signal received from the photoelectric sensor 109 and the temperature signal received from the temperature sensor 138. The volume correction factor is calculated by comparing a known volume of interior chamber 50 (a volume between two positions of piston and poppet valve assembly 64 within interior chamber 50 that correspond to when photoelectric sensor 109 is at the leading edge of the first flag 106 and second flag 108) with a volume of fluid flowing through the flow meter 125 during the time between when the processor 21a receives the first signal and the second signal from photoelectric sensor 109. The known volume of interior chamber 50, V, is obtained by the means of waterdraw calibration either volumetrically or gravimetrically using NIST certified volume test measures (volumetric) or NIST certified weighing devices (gravimetric). The volume displaced by the piston assembly 16 as photoelectric sensor 109 moves from the leading edge of the first flag 106 to the leading edge of the second flag 108 is liquid measured (volumetric) or weighed (gravimetric) through a series of runs then averaged to determine the certified, known volume of interior chamber 50, V. Processor 21a may calculate the volume of fluid flowing through the flow meter 125 during the time between when the processor 21a receives the first signal and the second signal from photoelectric sensor 109 by counting meter pulses or signals received from flow meter 125 during this time. The meter pulses or signals correspond to a volume of fluid flowing through the flow meter 125, as is generally known in the art.

Processor 21a uses the temperature signal received from temperature sensor 138 to adjust the known volume V of interior chamber 50 based on expansion and contraction of flag rod 39a due to temperature changes. For example, the distance L between first stationary flag 106 and second stationary flag 108 may be measured when flag rod 39a is at a particular reference temperature. When the temperature of flag rod 39a raises, causing expansion of flag rod 39a, or lowers, causing contraction of flag rod 39a, the distance L between first stationary flag 106 and second stationary flag 108 will be longer or shorter than the original distance measured with flag rod 39a at the reference temperature. Processor 21a uses the temperature signal received from temperature sensor 138 and a known thermal expansion coefficient of the material from which flag rod 39a is formed to calculate the change in distance L and volume V due to the temperature caused expansion or contraction of flag rod 39a. This temperature corrected volume V is used to calculate the volume correction factor for flow meter 125 as described below.

Flow meter prover 10 calculates a volume correction factor for flow meter 125 by comparing the known volume of interior chamber 50 when photoelectric sensor 109 is between the leading edges of first and second flags 106 and 108, V, with the volume of fluid flowing through the flow meter 125 during the time between when the processor 21a receives the first signal and the second signal from photoelectric sensor 109. The volume correction factor calculated by flow meter prover 10 is thus based on a fixed volume V defined by the distance between the first and second stationary flags 106 and 108. The first and second stationary flags 106 and 108, which determine the volume points for the known volume V of the flow meter prover 10, are rigidly fixed to flag rod 39a and do not need to be removed from flag rod 39a. In the event of necessary maintenance or replacement of the photoelectric sensor 109, the fixed volume points (or flags 106 and 108) are not disturbed, which eliminates the need to recertify the known volume V of the flow meter prover 10. The only volume recertification needed would be based on the recommended API volume recertification frequency.

Control system 21 also includes a safety switch (not shown) positioned adjacent cover 40. When cover 40 is in the closed position shown in FIG. 1, the safety switch is in a first position, in which linear actuator 92 may receive instructions from processor 21a to operate and move carriage 96 and electromagnet 102 may be powered on to generate a magnetic field. When cover 40 is moved to the open position shown in FIG. 3A, the safety switch is moved to a second position, in which it opens a safety contact that prevents and immediately stops the movement of carriage 96 and turns off or prevents the operation of electromagnet 102.

In operation, flow meter prover 10 may be used to precisely obtain, or gather, enough data to calculate a correction factor for any particular flow meter (e.g., flow meter 125) at a given flow rate. The correction factor is used to compensate for inaccuracies of the flow meter for that given flow rate.

The fluid inlet 52 (FIG. 2) of flow meter prover 10 is placed in fluid communication with fluid flowing through a pipeline and the fluid outlet 54 is placed in fluid communication with the pipeline to divert fluid from the pipeline through the flow meter prover 10. Flow meter prover 10 is connected to the pipeline so that fluid entering or exiting flow meter prover 10 also flows through flow meter 125. As fluid flows through the pipeline and flow meter prover 10, piston assembly 16 is normally in the finish position shown in FIG. 3A. In this position, piston and poppet valve assembly 64 (FIG. 2) is normally open, as is generally known in the art, to allow fluid to flow through cylinder 49 from fluid inlet 52 to fluid outlet 54.

When it is desired to acquire a new volume correction factor for flow meter 125, which may occur at predetermined time intervals or when a user provides instructions through control system 21 to begin operation of flow meter prover 10, processor 21a sends instructions to linear actuator 92 to move carriage 96 from its first position shown in FIG. 3A to its second position shown in FIG. 3B. Processor 21a also sends instructions to power on electromagnet 102. Electromagnet 102 engages resilient target 76 to couple actuator assembly 18 to piston assembly 16. Processor 21a then sends instructions to linear actuator 92 to move carriage 96 from its second position shown in FIG. 3B back to its first position, as shown in FIG. 3C. Processor 21a then sends instructions to power off electromagnet 102 and decouple piston assembly 16 from actuator assembly 18.

Fluid flowing through fluid inlet 52 (FIG. 2) then engages piston and poppet valve assembly 64 to move piston assembly 16 from its start position shown in FIG. 3C to its finish position shown in FIG. 3A. As piston assembly 16 moves, piston and poppet valve assembly 64 is closed to prevent fluid from flowing through or around it. Photoelectric sensor 109 senses the first and second stationary flags 106 and 108 as piston assembly 16 moves to its finish position, and sends the first and second signals to control system 21 as described above. Based on the first and second control signals and the temperature signal, control system 21 calculates the volume correction factor for the flow meter 125, in the manner described above. When piston assembly 16 is in its finish position, piston and poppet valve assembly 64 opens to allow fluid to flow through it. This process is preferably repeated several times to obtain an accurate volume correction factor within a desired margin of error.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A flow meter prover comprising:
    a piston assembly that is movable from a start position to a finish position; and
    an actuator assembly comprising:
        a linear actuator comprising a rail; and
        a carriage that slidably engages the rail, wherein the linear actuator moves the carriage linearly on the rail between a first position and a second position, wherein the carriage is operable to releasably couple to the piston assembly, and wherein the carriage is operable to move the piston assembly from the finish position to the start position as the carriage moves from the second position to the first position,
    wherein the piston assembly comprises a first end and a second end, and wherein the carriage is operable to releasably couple to the first end of the piston assembly, and
    wherein the piston assembly further comprises a piston rod and a guide plate that is coupled to an end of the piston rod adjacent the first end of the piston assembly, and further comprising at least one guide rod or flag rod slidably received by an opening in the guide plate.

2. The flow meter prover of claim 1, further comprising a cylinder comprising a fluid inlet and a fluid outlet, wherein the second end of the piston assembly is positioned in the cylinder, and wherein fluid entering the fluid inlet is operable to move the piston assembly from its start position to its finish position when the carriage is decoupled from the piston assembly.

3. The flow meter prover of claim 1, wherein at least one flag rod and two guide rods are each slidably received by one of first, second, and third bearings mounted within respective openings in the guide plate.

4. The flow meter prover of claim 1, wherein at least one flag rod is slidably received by the opening in the guide plate and further comprising:
    a pair of spaced apart stationary flags mounted to the flag rod; and
    a photoelectric sensor mounted to the guide plate.

5. The flow meter prover of claim 1, wherein at least one flag rod is slidably received by the opening in the guide plate, wherein the flag rod presents a hollow interior that is filled with a fluid, and further comprising a temperature sensor at least partially positioned within the hollow interior of the flag rod.

6. The flow meter prover of claim 1, wherein the piston assembly further comprises a resilient target at the first end of the piston assembly, and wherein the carriage is operable to releasably engage the resilient target.

7. The flow meter prover of claim 1, wherein the carriage comprises an electromagnet that is operable to releasably couple to the piston assembly.

8. The flow meter prover of claim 1, wherein the carriage moves linearly on the rail from the first position to the second position and from the second position to the first position.

9. The flow meter prover of claim 1, further comprising:
    a pair of spaced apart stationary flags; and
    a photoelectric sensor mounted on the piston assembly.

10. A flow meter prover comprising:
    a flag rod;
    a piston assembly presenting an opening that slidably receives the flag rod;
    a first flag mounted to the flag rod;
    a second flag mounted to the flag rod and spaced apart from the first flag; and
    a photoelectric sensor mounted to the piston assembly adjacent the opening, wherein the photoelectric sensor is operable to sense the first flag and the second flag as the piston assembly slides on the flag rod, and wherein the photoelectric sensor generates a first signal when it senses the first flag and a second signal when it senses the second flag.

11. The flow meter prover of claim 10, wherein the piston assembly comprises a first end and a second end, wherein the piston assembly further comprises a piston rod and a guide plate that is coupled to an end of the piston rod adjacent the first end of the piston assembly, wherein the guide plate presents the opening that slidably receives the flag rod, and wherein the photoelectric sensor is mounted to the guide plate.

12. The flow meter prover of claim 11, further comprising first and second guide rods slidably received by second and third openings, respectively, in the guide plate.

13. The flow meter prover of claim 11, wherein the piston assembly is movable from a start position to a finish position.

14. The flow meter prover of claim 13, further comprising a cylinder comprising a fluid inlet and a fluid outlet, wherein the second end of the piston assembly is positioned in the cylinder, and wherein fluid entering the fluid inlet is operable to move the piston assembly from its start position to its finish position.

15. The flow meter prover of claim 14, further comprising a processor coupled to the photoelectric sensor, wherein the processor calculates a volume correction factor based on the first signal and the second signal.

16. A flow meter prover comprising:
  a piston assembly that is movable from a start position to a finish position; and
  an actuator assembly comprising a carriage that moves linearly between a first position and a second position, wherein the carriage comprises an electromagnet that is operable to releasably couple to the piston assembly, and wherein the carriage is operable to move the piston assembly from the finish position to the start position as the carriage moves from the second position to the first position.

17. The flow meter prover of claim 16, wherein the actuator assembly comprises a linear actuator comprising a rail that the carriage slidably engages, and wherein the linear actuator moves the carriage linearly on the rail from the first position to the second position and from the second position to the first position.

18. The flow meter prover of claim 17, further comprising:
  a cylinder comprising a fluid inlet and a fluid outlet, wherein an end of the piston assembly is positioned in the cylinder, and wherein fluid entering the fluid inlet is operable to move the piston assembly from its start position to its finish position when the carriage is decoupled from the piston assembly;
  a flag rod slidably received by an opening in the piston assembly;
  first and second stationary flags each mounted to the flag rod and spaced apart from each other; and
  a photoelectric sensor mounted on the piston assembly.

19. The flow meter prover of claim 18, wherein the photoelectric sensor is operable to sense the first flag and the second flag as the piston assembly slides on the flag rod, wherein the photoelectric sensor generates a first signal when it senses the first flag and a second signal when it senses the second flag, and further comprising a processor coupled to the photoelectric sensor, wherein the processor calculates a volume correction factor based on the first signal and the second signal.

20. The flow meter prover of claim 18, wherein the flag rod presents a hollow interior that is filled with a fluid, and further comprising a temperature sensor at least partially positioned within the hollow interior of the flag rod.

21. A flow meter prover comprising:
  a piston assembly that is movable from a start position to a finish position, wherein the piston assembly comprises a guide plate that presents an opening;
  a flag rod slidably received by the opening in the guide plate, wherein the flag rod presents a hollow interior that is filled with a fluid;
  at least one flag mounted to the flag rod; and
  a temperature sensor at least partially positioned within the hollow interior of the flag rod.

22. The flow meter prover of claim 21, further comprising a photoelectric sensor mounted to the piston assembly, further comprising a second flag mounted to the flag rod and spaced apart from the first flag, wherein the photoelectric sensor is operable to sense the flag and the second flag as the piston assembly slides on the flag rod, and wherein the photoelectric sensor generates a first signal when it senses the flag and a second signal when it senses the second flag.

23. The flow meter prover of claim 22, further comprising a processor coupled to the photoelectric sensor and the temperature sensor, wherein the temperature sensor generates a temperature signal, and wherein the processor calculates a volume correction factor based on the first signal, the second signal, and the temperature signal.

24. The flow meter prover of claim 21, wherein the flag rod further comprises an interior surface that surrounds the hollow interior, and wherein the flag rod further comprises a sensor guide that is coupled to the interior surface, wherein the sensor guide presents a sensor opening that receives a portion of a temperature probe coupled to the temperature sensor.

25. The flow meter prover of claim 21, wherein the fluid comprises glycol.

26. A flow meter prover comprising:
  a piston assembly that is movable from a start position to a finish position;
  an actuator assembly comprising:
    a linear actuator comprising a rail; and
    a carriage that slidably engages the rail, wherein the linear actuator moves the carriage linearly on the rail between a first position and a second position, wherein the carriage is operable to releasably couple to the piston assembly, and wherein the carriage is operable to move the piston assembly from the finish position to the start position as the carriage moves from the second position to the first position,
  a pair of spaced apart stationary flags; and
  a photoelectric sensor mounted on the piston assembly.

* * * * *